United States Patent [19]

Chandler et al.

[11] Patent Number: 4,695,883
[45] Date of Patent: Sep. 22, 1987

[54] DIGITAL VIDEO COMPRESSION SYSTEM WITH VARIABLE DIGITAL FILTER

[75] Inventors: Van S. Chandler, Fort Worth; Robert A. Arnstein, Dallas, both of Tex.

[73] Assignee: Concept Communications, Inc., Stamford, Conn.

[21] Appl. No.: 790,869

[22] Filed: Oct. 24, 1985

[51] Int. Cl.$^4$ ............... H04N 7/12; H04N 11/06; H04N 11/20; H04N 1/419

[52] U.S. Cl. ............................ 358/138; 358/11; 358/12; 358/135; 358/261

[58] Field of Search ............... 358/11, 12, 135, 136, 358/138, 261

[56] References Cited

U.S. PATENT DOCUMENTS 4,025,950 5/1977 Matsumoto et al. .
4,302,775 11/1981 Widergren et al. .
4,455,571 6/1984 Shimizu et al. .
4,517,596 5/1985 Suzuki .

Primary Examiner—E. A. Goldberg
Assistant Examiner—Patrick W. Foster
Attorney, Agent, or Firm—Arthur L. Plevy

[57] ABSTRACT

A method and system for compressing television video signals for digital transmission allows full motion pictures to be transmitted. The analog signal is digitized and stored in a memory A in consecutive pixel value locations. The values of the color components of each pixel value are summed and stored in a memory B. In the second frame, the sum of each pixel value is compared with the sums stored in memory B. If the difference is greater than a filter number, then that particular pixel is transmitted by the control computer. The total number transmitted for each frame is compared to a maximum allowable data rate, and the filter number is adjusted accordingly.

20 Claims, 4 Drawing Figures

DIGITAL VIDEO COMPRESSION SYSTEM WITH VARIABLE DIGITAL FILTER

BACKGROUND OF THE INVENTION

1. Field of the Invention:

This invention relates generally to full motion video transmission over communication channels, and more particularly to such a system which digitizes the analog video and compresses the data for transmission.

2. Description of the Prior Art:

Color television video transmission uses a complex analog signal which is broadcast over the air. The video signal has components in it that control red, green and blue "guns" located in the television receiver. The receiver screen is divided into a large number of points, called pixels, which the red, green and blue guns fire against. The intensity of the color from each gun depends upon the video signal, and when mixed at each pixel, defines the desired color for the screen at that particular point. The guns sweep horizontally across the screen line by line until an entire frame is completed. Normally, there are about thirty frames per second.

Efforts are being made to send video signals in digital form over communication channels for telephone conferences and the like. The communication channels may be telephone lines or local area networks. The analog video signal can be digitized into a digital word for each pixel. The digital word or number will have components therein to control the relative intensity of the red, green and blue guns. These digital numbers can be transmitted through a modem of a control computer to a receiver for display. These digital signals could also be stored on a disk for playback. However, there will be an extremely large number of bytes to transmit in a very short space of time. There can be from 50,000 to 200,000 bytes per frame, and normally thirty frames per second are transmitted in conventional television broadcasting. There are two fields that make up a standard video frame, commonly called an odd field and an even field. It sends the information in one field first, and next the other field, which comprises in between lines. Existing communication channels, which may handle between 56K baud (56,000 bits per second) and 1000K baud, cannot handle that rate of transmission. The amount of bits would also require an excessive amount of storage space if stored on disks.

Often, much of the television frame changes little from frame to frame. Particularly in telephone conferencing, there would be normally a constant background. Efforts are now being made to transmit full motion video, but introducing only a portion of the signal to lower the number of bytes that must be transmitted for each frame. There are several methods. One method divides the screen into many small sections, and through extensive processing, gives priority to the sections with the most severe movement. Other methods merely slow the frame rate, resulting in a jerky picture. The equipment is expensive, or the picture quality is poor. The prior art systems are inflexible and they cannot adapt to various transmission rates to take advantage of higher data rates allowed on some systems than on others.

SUMMARY OF THE INVENTION

In this invention, a method and a system is shown for compressing television video frames for transmission over communications channels. The analog signals are digitized into color components for the pixels of the first frame. The digital pixel values are stored in a memory A. The pixel value has components representing the red, green and blue guns. These components are summed and loaded into a memory B. The first frame is outputted from memory A to the computer for transmission.

The next frame is digitized and stored in memory A, replacing the previous frame pixel value. The color components of each pixel value of the next frame are summed. The difference between the sum of the pixel value from the second frame and the sum of the corresponding pixel value of the first frame is taken. If this difference exceeds a filter number which is predetermined, then the second frame pixel value from memory A is outputted to the control computer for transmission. If the difference between the sums is below the filter number, then it is not outputted through the control computer for transmission. In this manner, only the pixel values which have changed significantly will be transmitted, greatly lowering the number of bytes required for transmission or storage.

The filter floats. Once the frame is completed, the total number transmitted by the control computer is compared to the maximum allowable data rate. If it has exceeded the maximum allowable data rate, then the filter number is adjusted upward proportionately. If not, the filter number is adjusted downward proportionately.

DESCRIPTION OF THE PREFERRED EMBODIMENT

Figure 1:
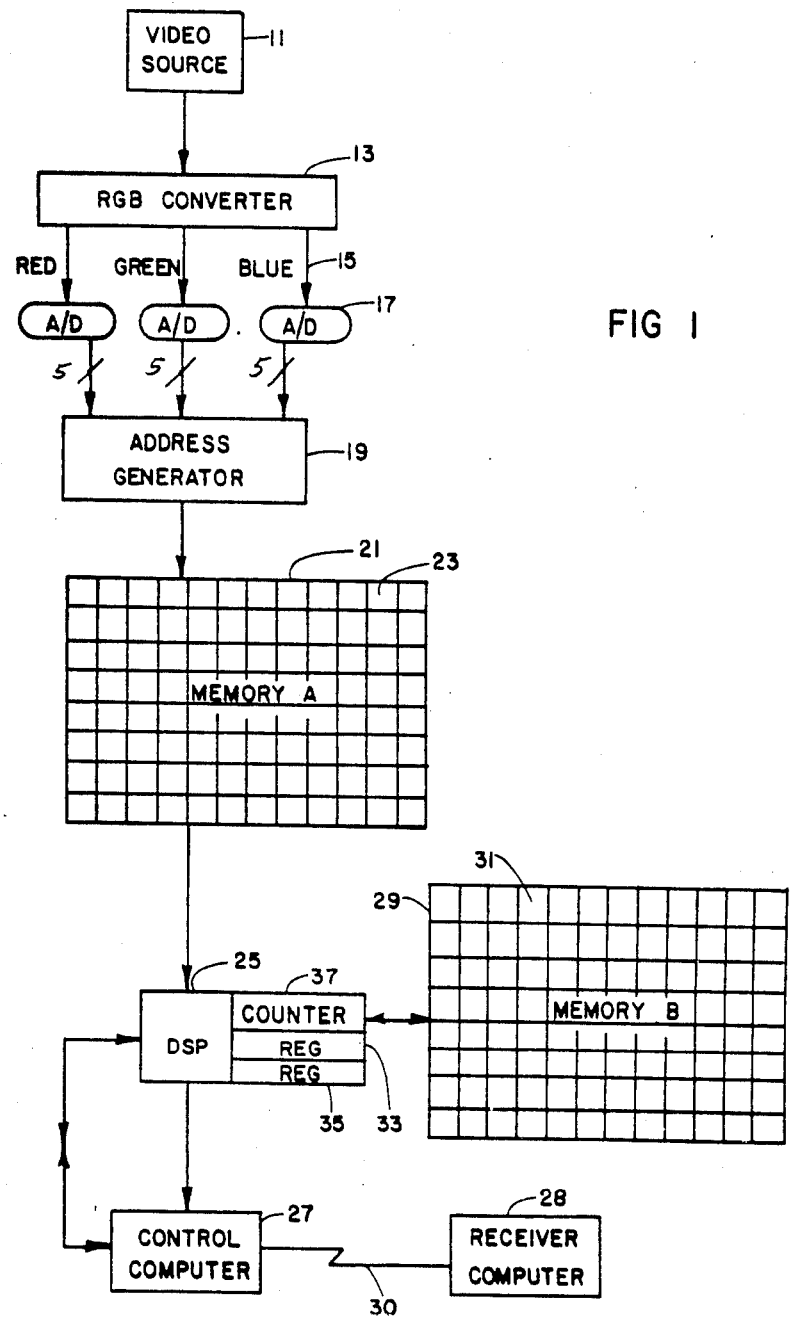
FIG. 1 is a block diagram illustrating the main components of a system constructed in accordance with this invention.

Referring to FIG. 1, the video source 11 will be a source of analog color television video signals, such as an output from a video camera. The signals pass through a color converter 13, which converts the composite signal to red, green and blue components. The converter 13 is a standard element. The various components are each fed over a separate line 15 to an analog to digital converter 17. The digital values pass over data lines to an address generator 19, which stores the digital values in a memory 21, which is also referred to as memory A.

Memory 21 is schematically shown to include a large number of locations 23, each representing a pixel or point on the television screen. When fully loaded for one frame, each digital number in each location 23 will contain the information necessary to control the relative intensities of red, green and blue guns (not shown) of a receiver monitor. In the preferred embodiment, there will be about 65,000 memory cells or locations 23. Preferably, each digital pixel value in each location 23 is a 16 bit, or two byte number. Five of the bits represent red, five of the bits represent green, and five of the bits represent blue. The remaining bit, which is the most significant or highest order bit, has a use which will be described subsequently.

A high speed digital signal processor 25 is connected to memory 21. DSP 25 is a conventional processor, preferably a TI 32010 integrated circuit manufactured by Texas Instruments, Dallas, Texas. DSP 25 is capable of summing and subtracting functions. DSP 25 is connected to a means for forwarding or storing the pixel values such as a control computer 27, which may be a conventional personal computer. Control computer 27 has an internal modem for transmitting digital signals over a communication link 30, such as telephone lines, to a receiver computer 28, which includes a monitor (not shown) for displaying the picture.

DSP 25 is also linked to a memory 29, also referred to as memory B. Memory 29 is a memory unit, similar to memory 21, having locations or cells 31. The locations 31 each hold the sum of the color components of each pixel value. Two registers 33 and 35 are a part of the DSP 25. A digital counter 37 also forms a part of the DSP 25.

Figure 2:
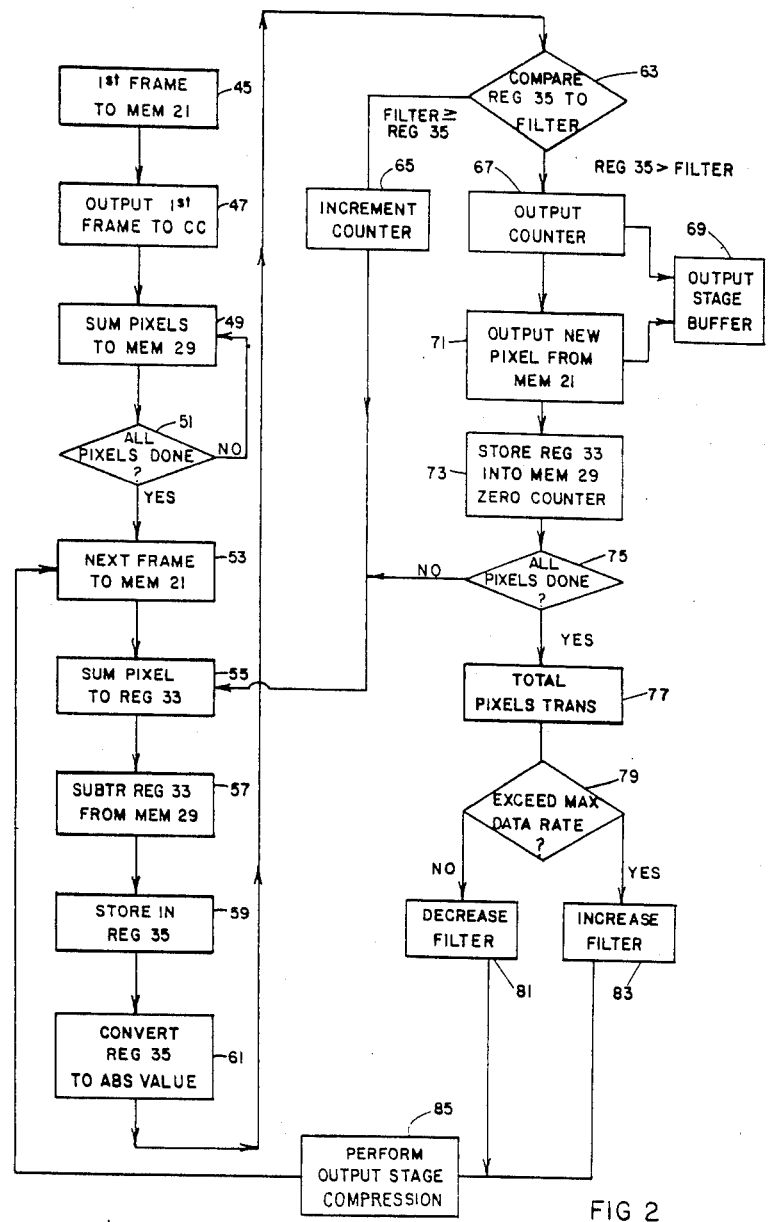
FIG. 2 is a flow chart representing the method steps of this invention.

Referring also to FIG. 2, in step 45, the first frame from the video source 11 is converted to RGB components by converter 13, then converted into digital form by converter 17 and loaded into memory 21. Preferably only one field of the frame is used, and the other field is ignored. The "field" is referred to herein as the "frame", even though it actually is only one half of a frame. The DSP 25 preferably outputs the entire contents stored for the first frame to the control computer 27, as indicated by step 47. The control computer sends the first frame over the communication link 30 to the receiver computer 28, over a time period that is sufficient for all of the bytes to be transmitted. Memory 21 continues to hold the pixel values from the first frame.

Then, the DSP 25 stores a selected form of the color components in memory 29. Preferably, the DSP sums the components of each pixel value stored in memory 21. For example, the intensity of each red, blue and green gun can be any number between 0 and 31, each represented by 5 bits of the 16 bit pixel value. The sum can thus be any number from 0 to 93. If, for the first pixel value, red is 14, green is 20 and blue is 10, then the sum would be 44. As indicated by step 49, the sum of each pixel value is loaded into consecutive locations 31 in memory 29. There will be a location 31 in memory 29 corresponding to each pixel location 23 in memory 21. Step 51 inquires whether or not all the pixel values are loaded, and indicates that the summing continues until the entire frame is summed and loaded into memory 29.

Then, as indicated by step 53, the next frame is loaded into memory 21. Preferably, only one field out of every other frame from the video source 11 will be digitized and processed. The remaining frames will not be used. The pixel values of this next frame are digitized and loaded into memory 21, replacing all of the original values from the first frame.

The DSP 25 then takes in step 55 the first pixel value in memory 21, sums its color components, and loads the sum into register 33. Then, as shown in step 57, the sum in register 33 is subtracted from the sum loaded in the first location 31 in memory 29. The difference, as shown by step 59, is stored in register 35. The DSP 25 converts this difference to an absolute value in step 61.

The absolute value of the difference is compared to a filter number in step 63. This filter number is a floating number that is adjusted as will be described subsequently. If the filter number is greater than or equal to the absolute value in register 35, the counter 37 will increment to a new number, as shown in step 65. The DSP 25 then proceeds back to step 55 to sum the next pixel value in memory 21, store the sum in register 33, and repeat the steps back to step 63.

If the absolute difference of any of the sums of the pixel values exceed the filter number, then the DSP 25 causes the counter 37 to output its current value to the control computer 27, as indicated by step 67. When the counter 37 value is outputted in step 67, counter 37 is zeroed again. The number output by the counter 37 represents the number of times that the value in register 35 was less than the filter number since the last time that the value in register 35 was greater than the filter number. This counter number is sent to an output stage buffer in step 69. Also, each time the sum of the differences is greater than the filter, the corresponding pixel value loaded in memory 21 is outputted in step 71 to the output stage buffer 69.

When a pixel value is outputted to control computer 27, the sum of that pixel value is shifted from register 33 into memory 29 to replace the sum of the pixel value which had been previously in that place. This is performed in step 73. Memory 29 is thus updated each time the difference in the sums between one pixel value and the pixel value sum contained in memory 29 exceeds the filter number. Step 75 inquires whether all of the pixels are done. The summing and comparison with the sums in memory 29 takes place sequentially for an entire frame. If not completed, the DSP 25 again proceeds to step 55 to sum another pixel value from memory 21.

Once all of the pixel values are summed from a particular frame and compared to the sums in memory 29, a determination is made in step 77 whether or not to change the value of the filter. The DSP 25 totals the number of pixel values which were outputted from memory 21 to the output stage buffer 69. These pixel values would be the ones in which their sums differed from the sums in memory 29 by an amount greater than the filter number. All of these pixel values passing to buffer 69 will be transmitted by the control computer 27 (FIG. 1) if possible.

The number may exceed the number that the communication link 30 (FIG. 1) is capable of handling in that fraction of a second. If so, control computer 27 will transmit only the pixels that the communication link 30 can handle, then it will stop. The total number might also exceed the maximum data rate for storage on a disk. Step 79 querries whether or not it exceeded the maximum data rate for the system. In other words, if the system is capable of 56K baud, but the number of pixel values to be transmitted from that frame exceeded 56K baud, then in step 83, the filter is increased for the transmission of the next frame. If the number of pixel values to be transmitted exceeded the data rate by ten percent, the filter is increased by ten percent in step 83. On the other hand, if very little change took place, and the total number of pixel values transmitted was far less than what the system could handle, then the filter number is decreased proportionately in step 81 for use with the next frame. In step 85, output stage compression takes place, which is shown in more detail in FIG. 3.

Figure 4:
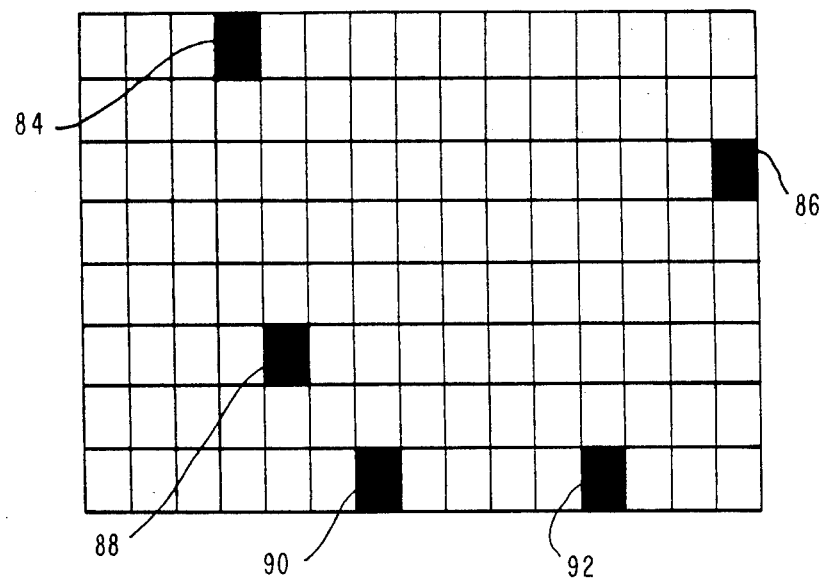
FIG. 4 is a schematic representation of a frame with five of the pixels being transmitted to a receiver computer.

The information forwarded to buffer step 69 contains a 16 bit pixel value which represents the various RGB color intensities. Also, a skip count number is applied to the buffer 69. The skip count number is the number of times that the counter 37 was incremented in step 65 before it was outputted and reset in step 67. This skip count locates the positions of the pixel values which will be transmitted to the receiver computer 28. For example, referring to FIG. 4, assume that there were five pixel values 84, 86, 88, 90 and 92 in a frame which were transmitted from memory 21 to the control computer 27 for transmission. These five pixel values are the pixels in which their sums differed from the sums previously stored in memory 29 by a value greater than the filter number. The compressed picture to be transmitted will be as follows:

3, pixel value 84; 40, pixel value 86; 34, pixel value 88; 31, pixel value 90; and 4, pixel value 92

This indicates that the receiver computer 28 will output a new color for pixel value 84, which is the fourth pixel in the frame. It will retain and display the old pixel values for the next 40 pixels. Then it will output a pixel value for pixel value 86. The numbers 34, 31, and 4 represent the spaces between pixel values 86 and 88, 88 and 90, and 90 and 92 respectively. These numbers are the skip counts, and they indicate the number of unchanged pixels between the new colors. The pixel values 84, 86, 88, 90, and 92 will be 15 bit binary words, with five bits assigned to each red, green and blue color. The data is thus compressed, since in the example only five pixel values are being sent, rather than all of the pixel values.

Figure 3:
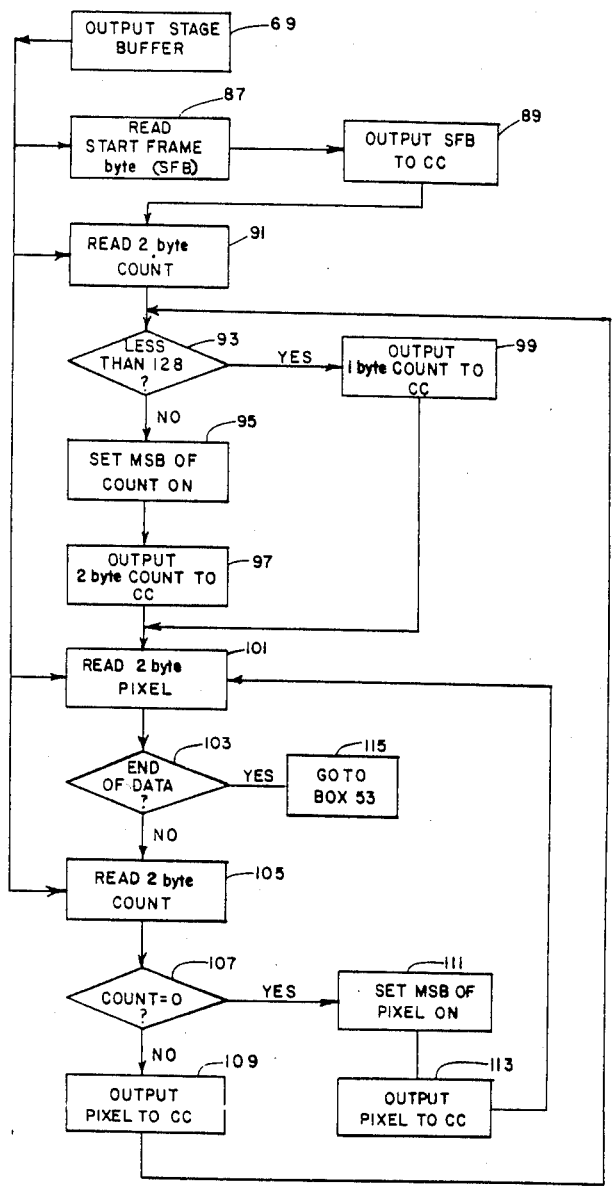
FIG. 3 is a flow chart of the output stage compression of a system constructed in accordance with this invention.

Referring to FIG. 3, the data is further compressed in the output stage. The buffer 69 holds the output data before final compression. The start frame byte is read in step 87 and output to the control computer 27 in step 89. The control computer reads in step 91 the skip count. There are enough pixels in the frame such that the count could take 2 bytes to represent. However, an inquiry is made whether or not the skip count is less than 128 in step 93. If the skip count is less than 128, then it takes only 1 byte to portray that number and only a single byte skip count is transmitted by control computer 27. The second byte, which would be all zeros, is not transmitted by control computer 27 as indicated in step 99.

If it is greater than or equal to 128, a two byte skip count is transmitted by the control computer 27 in step 97. The most significant bit of the two byte skip count is set to 1 in step 95. The most significant bit is the first bit, which would represent 2 to the sixteenth power. If it is set to 1, this will indicate to the receiver computer 28 that the skip count is a two byte number. It will thus know that the second byte following deals with the skip count, and not with a pixel value.

In step 101, the two byte pixel value is read by the control computer 27. There will always be a two byte pixel value, but the MSB (most significant bit) is not required to depict pixel values, since only 15 bits are required for the RGB components. In step 105, the two byte count for the next pixel is read by the control computer 27. As indicated by the lines on the left side of the flow chart of FIG. 3, data from buffer 69 is read as needed in steps 87, 91, 101, and 105. In step 107, an inquiry is made whether or not the skip count read in step 105 is zero. If not, in step 109, the first pixel value is outputted to the control computer 27 for transmission without further modification. If it is zero, this indicates that two pixels are being updated next to each other. In this case, the MSB of the first pixel value is set to 1, as indicated by step 111. In step 113, the pixel value is outputted to the control computer 27, with its MSB set to 1. In this case, the control computer 27 will not output any skip count for the immediately following pixel.

The receiver computer 28 upon receiving the pixel value number will know that there will be no skip count before the next pixel value comes, and that there will be no skip count transmitted. This further saves in the amount of data that must be transmitted, since it avoids sending a one byte skip count of all zeros. When the data has been completely transmitted for that frame, step 115 indicates a return back to box 53 to digitize the next frame into memory 21.

The receiver computer 28 could store the information for later playback or display the picture simultaneously. To display, the digital pixel values are converted to analog and used to control the RGB guns. The pixel values which are not updated are retained by the receiver computer 28 and converted to analog to become a part of the signal containing the updated pixel values.

The invention has significant advantages. Real motion is isolated and separated from noise and other variations by deriving the sum of the color components. This value indicates the overall brightness of a particular pixel on the screen, which changes significantly with motion, but very little with background noise. The best possible picture quality is provided given the amount of true motion by using the floating filter and the maximum allowable data rate. The filter indicates the degree of brightness change necessary before the device determines that a new pixel value is required. Since a given data rate will allow only a limited number of new pixels to be changed for each frame, the filter constantly changes to decide which ones should be transmitted. When motion is extreme, for example, people walking in front of the camera, the filter is floated very high so that only the most intense brightness changes are specified. When the motion slows down, the filter is reduced gradually, and each subsequent frame sharpens the picture quality. The floating filter also allows the device to adapt to a wide variety of maximum available data rates. For example, at 56K baud, the filter might float at values of ten to fifty, while at 1000K baud, it might float at lower numbers of three to eight.

The final compression stage futher reduces the amount of data by sending only one byte when the skip count is less than 128, and by sending no skip count bytes when the skip count is zero.

While the invention has been shown in only one of its forms, it should be apparent to those skilled in the art that it is not so limited, but is susceptible to various changes without departing from the scope of the invention.

We claim:

1. A method of compressing television video frames for display, comprising in combination:
   (a) digitizing a first frame into digital pixel values representing red, green and blue components of each pixel of the first frame;
   (b) storing the pixel values in a memory A in consecutive locations;
   (c) storing a selected form of the values into a memory B in consecutive locations;
   (d) digitizing a next frame into digital pixel values representing red, green, and blue components of each pixel of the next frame;
   (e) storing the pixel values of said next frame into memory A, replacing the stored pixel values of the the first frame;
   (f) determining the differences between selected forms of the values of said next frame with the selected forms from the first frame previously stored in memory B;

(g) comparing the differences determined in step (f) with a predetermined filter number; and (h) outputting for display only the pixel values stored in memory A for which the differences determined in step (f) were greater than the filter number.

2. A method of compressing television video frames for display, comprising in combination:
(a) digitizing a first frame into digital pixel values representing intensity and color components of the pixel of the first frame;
(b) storing the pixel values in a memory A in consecutive locations;
(c) summing the values of the components of the pixel values of the first frame and loading the sums into a memory B in consecutive locations;
(d) digitizing a next frame into digital pixel values representing intensity and color components of the pixels of the next frame;
(e) storing the pixel values of said next frame into memory A, replacing the stored pixel values of the first frame;
(f) summing the values of the components of the pixel values of said next frame;
(g) determining the differences between the sums determined in step (f) and the sums previously stored in memory B;
(h) comparing the differences determined in step (g) with a predetermined filter number; and
(i) outputting for display only the pixel values stored in memory A for which the differences between the sums determined in step (g) were greater than the filter number.

3. The method according to claim 2 further comprising:
totalling the number of pixel values for said next frame which were outputted for display in step (i);
comparing the total number with a prescribed allowable number for display;
decreasing the filter number correspondingly if the total number is less than the prescribed number; and
increasing the filter number correspondingly if the total number is greater than the prescribed number.

4. A method of compressing television video frames for display, comprising in combination:
(a) digitizing a frame into digital pixel values representing red, green and blue components of the pixels of the first frame;
(b) storing the pixel values in a memory A in consecutive locations;
(c) summing the values of the components of the pixel values of the frame and loading the sums into a memory B in consecutive locations;
(d) digitizing a next frame into digital pixel values representing red, green and blue components of the pixels of the next frame;
(e) storing the pixel values of said next frame into memory A, replacing the previously stored pixel values fo the preceding frame;
(f) summing the value of the components of the first pixel value of said next frame;
(g) determining the difference between the sum computed in step (f) with the sum stored in memory B for that location;

(h) if the difference determined in step (g) is less than a predetermined filter number, incrementing a counter number;

(i) if the difference determined in step (g) is greater than the filter number, outputting a skip count to a forwarding means, resetting the counter to zero, outputting the pixel value in memory A for that pixel to the forwarding means value, and storing the sum of the pixel value of said next frame in memory B to replace the previous sum;

(j) repeating steps (f)–(i) for each pixel of said next frame; and (k) forwarding from the forwarding means to a receiver means for display the pixel values and skip counts received by the forwarding means in step (i), with the skip counts locating the forwarded pixel values by informing the receiver means of the number of unchanged pixels between changed pixels.

5. The method according to claim 4 further comprising:
totalling the number of pixel values for said next frame which were outputted to the receiver means in step (k);
comparing the total number with a prescribed number allowed for the maximum data rate for the receiver means;
increasing the filter number correspondingly if the total number is greater than the prescribed number; and
decreasing the filter number correspondingly if the total number is less than the prescribed number.

6. The method according to claim 4, further comprising:
assigning red, green and blue color values to all bits in the pixel except for the most significant bit; and
indicating by the condition of the most significant bit of a pixel number whether the skip count for the next pixel number being outputted to the receiver means under step (k) is zero; and, if so, outputting to the forwarding means for forwarding only the next pixel value.

7. The method according to claim 4 further comprising:
determining if the skip count to be transmitted is less than 128; and, if so, outputting only a one byte skip count to the forwarding means; and
if not, outputting a two byte skip count to the forwarding means and indicating to the receiver means by the condition of the most significant bit of the two byte skip count that it is a two byte skip count.

8. A method of compressing television video frames for transmission over a communications channel, comprising in combination:
(a) digitizing a frame into digital pixel values representing red, green and blue components of each pixel of the first frame;
(b) storing the pixel values in a memory A in consecutive locations;
(c) summing the values of the components of the pixel values of the frame and loading the sums into a memory B in consecutive locations;
(d) digitizing a next frame into digital pixel values representing red, green and blue components of each pixel of the next frame;

(e) storing the pixel values of said next frame into memory A, replacing the previously stored pixel values of the preceding frame;
(f) summing the value of the components of the first pixel value of said next frame;
(g) determining the difference between the sum computed in step (f) with the sum stored in memory B for that location;
(h) if the difference determined in step (g) is less than a predetermined filter number, incrementing a counter number;
(i) if the difference determined in step (g) is greater than the filter number, outputting a skip count number to a control computer, resetting the counter to zero, outputting the pixel value in memory A for that pixel to the control computer, and storing the sum of the pixel value of said next frame in memory B to replace to previous sum;
(j) repeating steps (f)-(i) for each pixel of said next frame;
(k) transmitting from the control computer to a receiver the pixel values and skip counts received in step (i), with the skip counts locating the transmitted pixel values by informing the receiver the number of unchanged pixels between changed pixels.
(l) totalling the number of pixel values for said next frame which were outputted to the control computer in step (i);
(m) comparing the total number with a prescribed number allowed for the maximum data transmission rate for the communications channel;
(n) increasing the filter number correspondingly if the total number is greater than the prescribed number; and
(o) decreasing the filter number correspondingly if the total number is less than the prescribed number.

9. A system for compressing television video frames for display, comprising in combination:
means for digitizing frames into pixel values representing intensity and color components;
memory A means for storing in consecutive locations the pixel values of a frame;
forwarding means for forwarding pixel values to a receiver means;
output means for outputting selected pixel values in the memory A means to the forwarding means for forwarding;
summing means for summing the values of the components in each pixel value;
memory B means for storing in consecutive locations the sums of the values of the components of the pixel value;
subtraction means for determining the difference between the sums of the pixel values stored in memory B with the sums of the pixel values of a next frame;
comparison means for comparing the difference to a predetermined filter number, and for causing the output means to output the pixel value in memory A to the forwarding means for forwarding if the difference is greater than the filter number; and
counter means for incrementing a new count each time the difference is less than the filter number, and for resetting the count each time the difference is greater than the filter number, to provide a skip count for the forwarding means to forward to the receiver means to identify the locations of the pixel values being transmitted.

10. The system according to claim 9 further comprising:
comparison means for comparing the total number of the pixel values forwarded by the forwarding means for a frame to a prescribed number corresponding to the maximum data rate, and for adjusting the filter number correspondingly for each frame.

11. A method for compressing a color television signal on a field to field or frame to frame basis, with said field or frame indicative of a television display consisting of a given number of pixels, each one of said pixels indicative of a given area of said display, comprising the steps of:
storing in first separate memory locations the sum of values of the Red, Green and Blue (R,G,B) components for each of said pixels during a first frame,
storing in second separate memory locations a value indicative of the Red, Green and Blue (R,G,B) components for each of said pixels during the next successive frame,
deriving a stored sum for each value stored in said second locations, comparing said sum stored in each of said first locations with said derived sum to provide an output signal for each pixel as stored,
outputting only those pixels whose output signal exceeds a given threshold level selected according to a maximum allowable outputting rate.

12. The method according to claim 11, wherein the step of storing in second memory locations is storing a digital number having a first set of bits indicative of the Red component, a second set of bits indicative of the Green component, and a third set of bits indicative of the Blue component, with at least an additional bit, with said additional bit being a one or zero depending upon whether the next successive pixel is to be updated.

13. The method according to claim 12, further including the step of counting the number of pixels between outputted pixels whose output signal did not exceed said threshold to thereby provide a count between outputted pixels clearly defining the position of each outputted pixel with respect to said display.

14. The method according to claim 13, further including the step of monitoring said counting step to provide a skip count of a given number of digits for pixel counts between outputted pixels which do not exceed a given number, whereby the amount of data necessary to define certain counts is reduced.

15. In a system for compressing color television video frames for display in which system a compressed video signal is provided which signal may be transmitted over a communications link to a remote terminal for displaying said transmitted signal, said system of the type operative to convert a television signal on a frame to frame basis or a field to field basis to a plurality of pixels for each field or frame with said pixels indicative of points or areas on said display with each pixel associated with a digital number indicative of the display contents at said pixel location where said system operates to compare the display content of a first frame with the display content of the next frame to determine a difference in said content as compared to a threshold at each pixel location, to thereby transmit or display update only those pixels associated with said difference, in combination therewith of apparatus for providing said difference in content comprising:
first storage means having a plurality of first storage locations each operative to store therein a digital number indicative of the R, G and B content of each pixel of a present frame, second storage means having a plurality of second storage locations each having stored therein a digital number indicative of the sum of said R, G and B components as added and stored for the frame before said preset frame, means coupled to said first and second storage means and operative to provide a summed signal from said stored digital number at each pixel location in said first storage means and for comparing said summed signal with said sum stored in the corresponding pixel location, said second storage means to provide an output signal for each pixel in said display, and means responsive to said output signal for comparing said signal against a variable threshold level to output only those digital numbers as stored in said first storage means at those pixel locations which exceed said threshold level, whereby only the digital values stored in said first storage means indicative of pixel locations exceeding said threshold are outputted.

16. The system according to claim 15, further including means for counting the number of outputted pixels for providing said variable threshold level which varies according to the number of outputted pixels.

17. The system according to claim 16, wherein said digital number stored in said first storage means is a first given number of bits indicative of the Red (R) components, a second given number of bits indicative of the Green (G) component and a third given number of bits indicative of the Blue (B) component.

18. The system according to claim 17, wherein the sum stored in said second storage means represents the digital sum of said first, second and third bits.

19. The system according to claim 17 wherein said digital number as stored in said first storage means further includes at least one additional bit whose value is changed from a zero to a one indicative of the outputting of successive pixels as those pixels which immediately follow one another.

20. A system for compressing a color television signal on a field to field or frame to frame basis, with said field or frame indicative of a television display consisting of a given number of pixels, each one of said pixels indicative of a given area of said display, comprising:

storage means having a first plurality of storage locations each separate one associated with a separate pixel in said display and each having stored therein a digital number indicative of the sum of the values of the Red, Green and Blue (R, G, B) components as contained in said television signal during a first frame for each pixel in said first frame, and having a second plurality of storage locations each separate one associated with a separate corresponding pixel whereby each of said second locations corresponds to a separate one of said first locations and having stored in said second locations a digital value indicative of each of the values of said Red, Green and Blue components of a present frame, logic means coupled to said storage means and operative to compare the sum of said stored components in said first locations for each pixel with the sum of said values stored in said second locations for a corresponding pixel to provide an output signal for each pixel as stored indicative of said comparison exceeding a given threshold value to thereby identify any pixel in said display whose summed value as stored in said first location exceeds the summed value as derived from said second locations and means responsive to said output signal for outputting said digital value as stored in said second location for each of said identified pixels, whereby only those pixel values which exceed said threshold value are outputted and as strictly determined by the content of said R, G and B components as stored.

* * * * *